United States Patent [19]

Kelley et al.

[11] Patent Number: 6,070,840
[45] Date of Patent: Jun. 6, 2000

[54] LEVELING DEVICE FOR A SUPPORT LEG

[75] Inventors: James O. Kelley, Spring Lake; Andrew J. Kurrasch, Saugatuck; Errol S. Pearsons, Grand Haven; Robert L. Beck, Zeeland, all of Mich.

[73] Assignee: Herman Miller, Inc., Zeeland, Mich.

[21] Appl. No.: 09/080,079

[22] Filed: May 15, 1998

Related U.S. Application Data

[63] Continuation of application No. PCT/US96/18061, Nov. 14, 1996.
[60] Provisional application No. 60/006,834, Nov. 16, 1995.

[51] Int. Cl.[7] ................................................. F16M 11/24
[52] U.S. Cl. ................................ 248/188.4; 248/188.2; 248/650
[58] Field of Search ........................... 248/188.2, 188.4, 248/188.8, 649, 650, 371, 398; 108/144.11, 147

[56] References Cited

U.S. PATENT DOCUMENTS

| | | |
|---|---|---|
| 1,994,601 | 3/1935 | Wellman et al. ................. 248/650 |
| 2,194,366 | 3/1940 | Ott ................................. 248/649 |
| 2,309,484 | 1/1943 | Van Meter . |
| 2,803,510 | 8/1957 | Carbary . |
| 3,184,195 | 5/1965 | Wahl et al. . |
| 3,393,846 | 7/1968 | Cannon et al. . |
| 3,452,663 | 7/1969 | Machtig . |
| 3,674,230 | 7/1972 | Propst ............................ 248/188.8 |
| 3,718,306 | 2/1973 | Murray . |
| 3,927,853 | 12/1975 | Guth ............................. 248/188.2 |
| 4,056,903 | 11/1977 | Guarnere . |
| 4,135,690 | 1/1979 | Clarke et al. . |
| 4,368,869 | 1/1983 | Gelvezon et al. . |
| 4,375,300 | 3/1983 | Long et al. . |
| 4,394,563 | 7/1983 | Schnell . |
| 4,982,925 | 1/1991 | Hinderliter ................. 248/188.4 X |
| 5,141,190 | 8/1992 | Wu ............................... 248/188.4 |
| 5,205,421 | 4/1993 | Bustos . |

*Primary Examiner*—Leslie A. Braun
*Assistant Examiner*—Gwendolyn Baxter
*Attorney, Agent, or Firm*—Brinks Hofer Gilson & Lione

[57] ABSTRACT

An apparatus for leveling a support leg on a floor. The apparatus includes an ankle member extending from a bottom of the leg, a foot member, a heel member, and an adjustment device. The foot member includes a rear portion and a front portion which has a surface for engaging the floor. The ankle member is pivotally attached to the rear portion. The heel member extends downwardly from one of the rear portion of the foot member and the ankle member. The adjustment device interconnects the ankle member and foot member and is adapted to allow the foot member to be rotated through and fixed at various angles relative to said foot member.

29 Claims, 7 Drawing Sheets

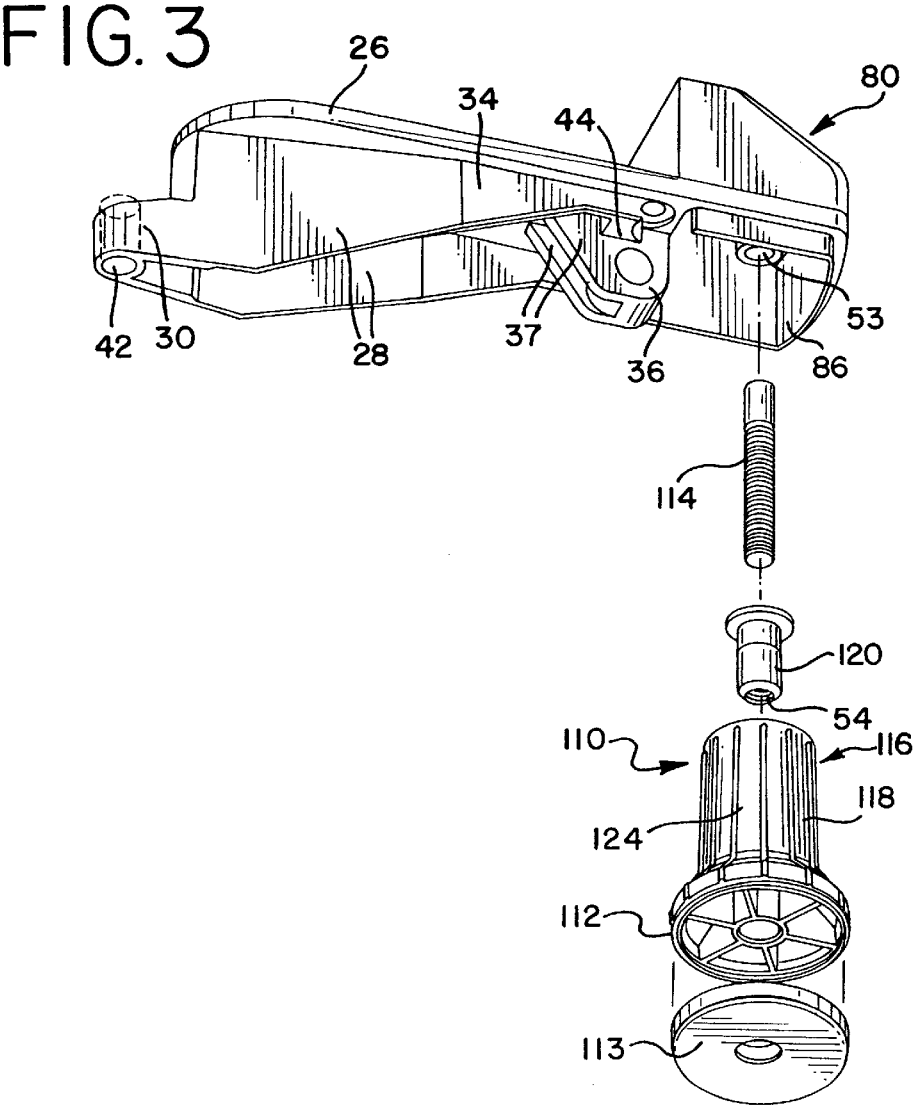
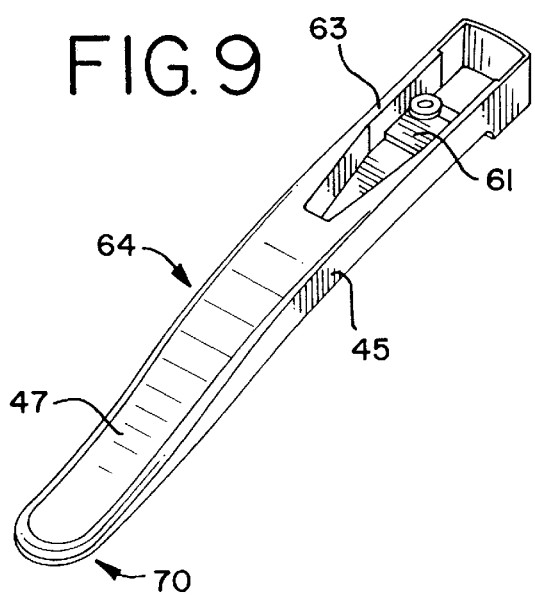

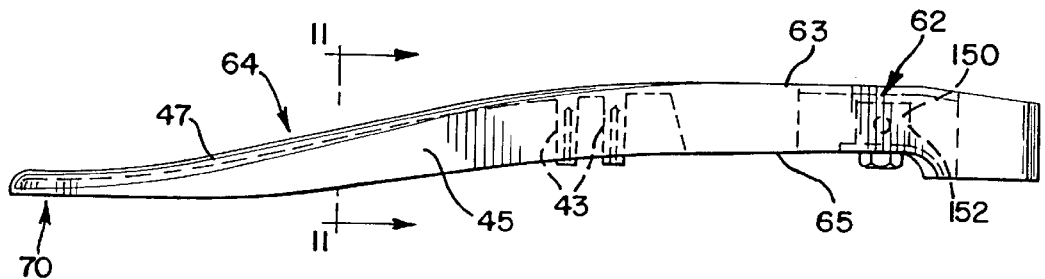
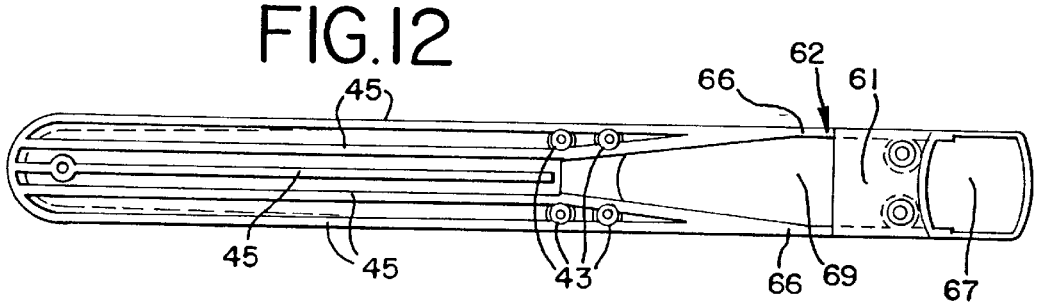
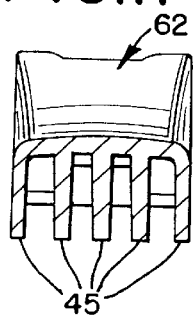
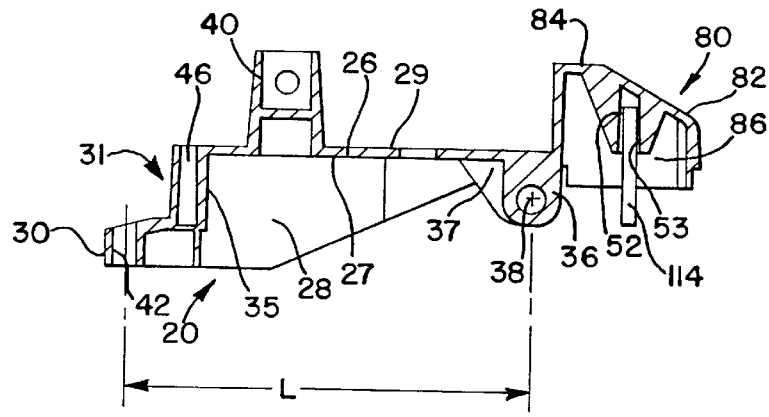
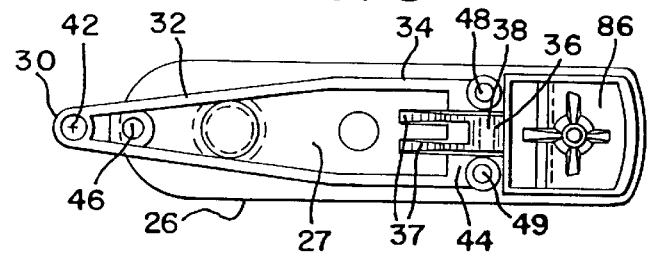

LEVELING DEVICE FOR A SUPPORT LEG

This application is a continuation of International Patent Application No. PCT/US96/18061, filed Nov. 14, 1996, which claims the benefit of U.S. Provisional Patent Application Ser. No. 60/006,834, filed Nov. 16, 1995 (now abandoned), the entire disclosures of which are hereby incorporated herein by reference.

BACKGROUND OF THE INVENTION

The present invention relates generally to a support device for office furniture, such as desks, tables or panels, and in particular, to an adjustable support device permitting level and plumb adjustments of the furniture.

In supporting an object, such as a desk or table, it is important that the object's work surface be maintained level and plumb so that items do not roll or slide on the work surface. In addition, the appearance of uneven and non-level office furniture can detract from the aesthetics, especially when such items are incorporated into a system of office furniture. Naturally, when a support surface, typically a floor, is rippled or not level, it can be difficult to obtain a level work surface.

Another leveling problem is encountered with C-shaped desks or furniture having a surface cantilevered outwardly from a pair of support legs. If the work surface is loaded down with various heavy objects and equipment, the free edge of the surface can deflect downward, thereby giving an unsatisfactory appearance when used in a system of office furniture.

In general, individual pieces of office furniture are supported by a plurality of support legs that engage the floor. For example, a typical desk may be supported by four legs, three legs, two legs or even one leg. In particular, two-legged C-shaped desks typically have elongated feet extending forwardly from the legs in order to provide structural stability, and to prevent tipping of the object being supported. Because the legs on a C-shaped desk are positioned toward the rear of the worksurface, the C-shaped configuration provides space for uninhibited knee movement and clearance when moving between adjacent worksurfaces.

When a desk is supported by three or more legs, it is well known in the art to use a leveling screw in each leg so as to provide the work surface with height adjustment and leveling capabilities. However, such leveling screws can be unacceptable for some two-legged objects. Because leveling screws typically permit movement in only the vertical direction, a piece of furniture incorporating such a design usually lacks any angular adjustment. In essence, the object being supported can be leveled in a side-to-side manner about an axis perpendicular to the plane formed by the legs, but cannot be leveled in a front-to-rear direction about an axis interconnecting the two legs.

To counter this leveling problem, it is known in the art to provide shims or leveling screws under one or both ends of the support feet. The shims can be unsightly, however, and may not be secured to the support leg, thereby making the system inherently unstable due to its susceptibility to jarring. Moreover, leveling devices or shims which raise an end of the support foot off the floor, or are contained within an end of the foot, can present a tripping hazard and interfere with a user's feet. This problem can be exacerbated in C-shaped desks, where it may be desirable to minimize the height of the foot in order to provide minimal obstruction to the user's feet as the user moves between adjacent worksurfaces.

Other types of leveling and plumbing designs, which overcome the shortcomings of the simple shim adjustment, typically require tedious manipulation, can be expensive to manufacture or can be difficult to install.

In an effort to overcome some of these shortcomings, U.S. Pat. No. 4,135,690, issued to Clarke et al., discloses a supporting foot member extending laterally in both directions from the support leg. The supporting foot is rotatably attached to the support leg by employing two friction plates. When loosened, the plates are allowed to rotate relative to each other in order to level the object being supported. Although such a device works satisfactorily for objects having a center of gravity overlying the support leg, such as the wall panel shown in that reference, it may be incapable of supporting large loads cantilevered off of the leg, such as a C-shaped desks. To support such a load, without allowing rotation of the support leg relative to the support foot, an enormous tension load may be required to clamp the plates together. If not installed correctly, or with the proper equipment, the proper orientation of the object being supported may be difficult to maintain.

Moreover, the device disclosed in Clarke et al. must be loosened prior to each leveling adjustment. Thus, the object being leveled is itself adjusted or manipulated to the proper position, rather than having a separate adjustment mechanism acting on the object. If the object is heavy or loaded with equipment, it can be difficult to move to the proper orientation while simultaneously engaging the locking device.

SUMMARY OF THE INVENTION

Briefly stated, the invention is directed to an apparatus for leveling a support leg on a floor. In particular, the apparatus has an ankle member extending from a bottom of the support leg, a foot member, a heel member and an adjustment device. The foot member has a front portion and a rear portion. The ankle member is pivotally attached to the rear portion about a horizontal axis of rotation. The front portion includes a surface for engaging the floor. The angle adjustment device adjustably interconnects the ankle member and the foot member at a location spaced apart from the horizontal axis of rotation. The heel member extends downwardly from one of the rear portion of the foot member and the ankle member and engages the floor.

In a preferred embodiment, the adjustment device includes a knob and a shaft extending upwardly from the knob. The shaft is rotatably secured to a bottom plate member, which is attached to the foot member. The shaft operably engages a front portion of the ankle member. In operation, rotation of the knob causes the front portion of the ankle member to move in a vertical direction relative to the floor, thereby causing the ankle member to rotate about the horizontal axis of rotation relative to the foot member. Thus, a leveling device is provided whereby a support leg, and any corresponding object being supported, can be leveled and plumbed In another aspect of the invention, the heel member is made height adjustable. The heel member extends downwardly from and is adjustably mounted to the rear portion of the ankle member. The heel member can be fixedly extended and retracted with said ankle member to adjust the height of the heel member and thereby adjust the height of the support leg. In addition, the heel member permits side-to-side leveling between opposing support legs.

The present invention provides significant advantages over other support devices in that the device provides a simple and inexpensive device for leveling objects such as office furniture. Moreover, when a cantilevered worksurface is loaded, the leveling device can be used to adjust for any downward deflection. In addition, the leveling device provides a simple device capable of supporting loads having a center of gravity spaced apart from the support leg.

Also, because the front portion of the foot member does not contain any type of leveling screw, it can be given a low profile. Accordingly, the leveling device provides minimal obstruction to movement of the user's feet and maximizes the open space between adjacent desks.

Moreover, when used in a system of furniture, each piece of furniture can be leveled and adjusted to accommodate an uneven support surface or loaded work surface, thereby providing and maintaining a smooth and continuous appearance of the system. The leveling device also permits vertical height adjustment, thereby allowing for additional flexibility and side-to-side leveling. Finally, because the leveling device provides an efficient means for adjusting the desk, even when heavily loaded, incremental adjustments can be made quickly and easily.

The present invention, together with further objects and advantages, will be best understood by reference to the following detailed description taken in conjunction with the accompanying drawings.

BRIEF DESCRIPTION OF THE DRAWINGS

FIG. 3 is an exploded view of the ankle and heel members.

FIG. 7 is a cross-sectional view of the ankle member taken along line 7—7 of FIG. 6.

FIG. 8 is a perspective view of the ankle member.

FIG. 9 is a perspective view of the foot member.

FIG. 10 is a side view of the foot member.

FIG. 11 is a cross-sectional view of the foot member taken along line 11—11 of FIG. 10.

FIG. 12 is a bottom view of the foot member.

DETAILED DESCRIPTION OF THE PREFERRED EMBODIMENTS

Figure 1:
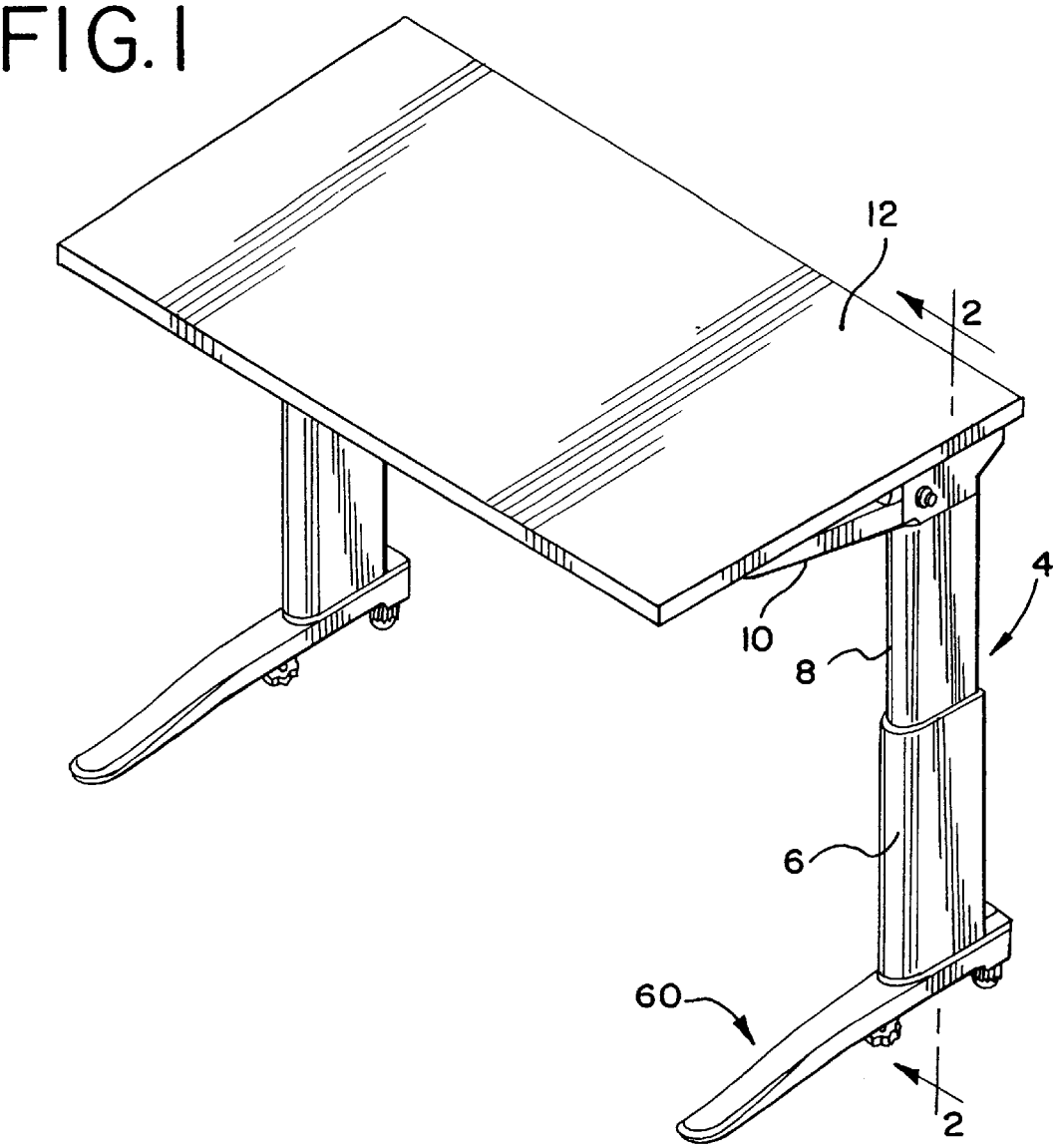
FIG. 1 is a perspective view of a desk with the leveling device of the preferred embodiment.
Figure 2A:
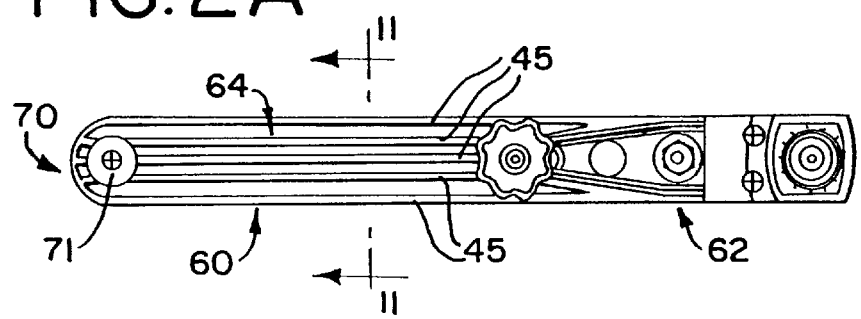
FIG. 2A is a bottom view of the leveling device taken along line 2A—2A in FIG. 2.
Figure 2:
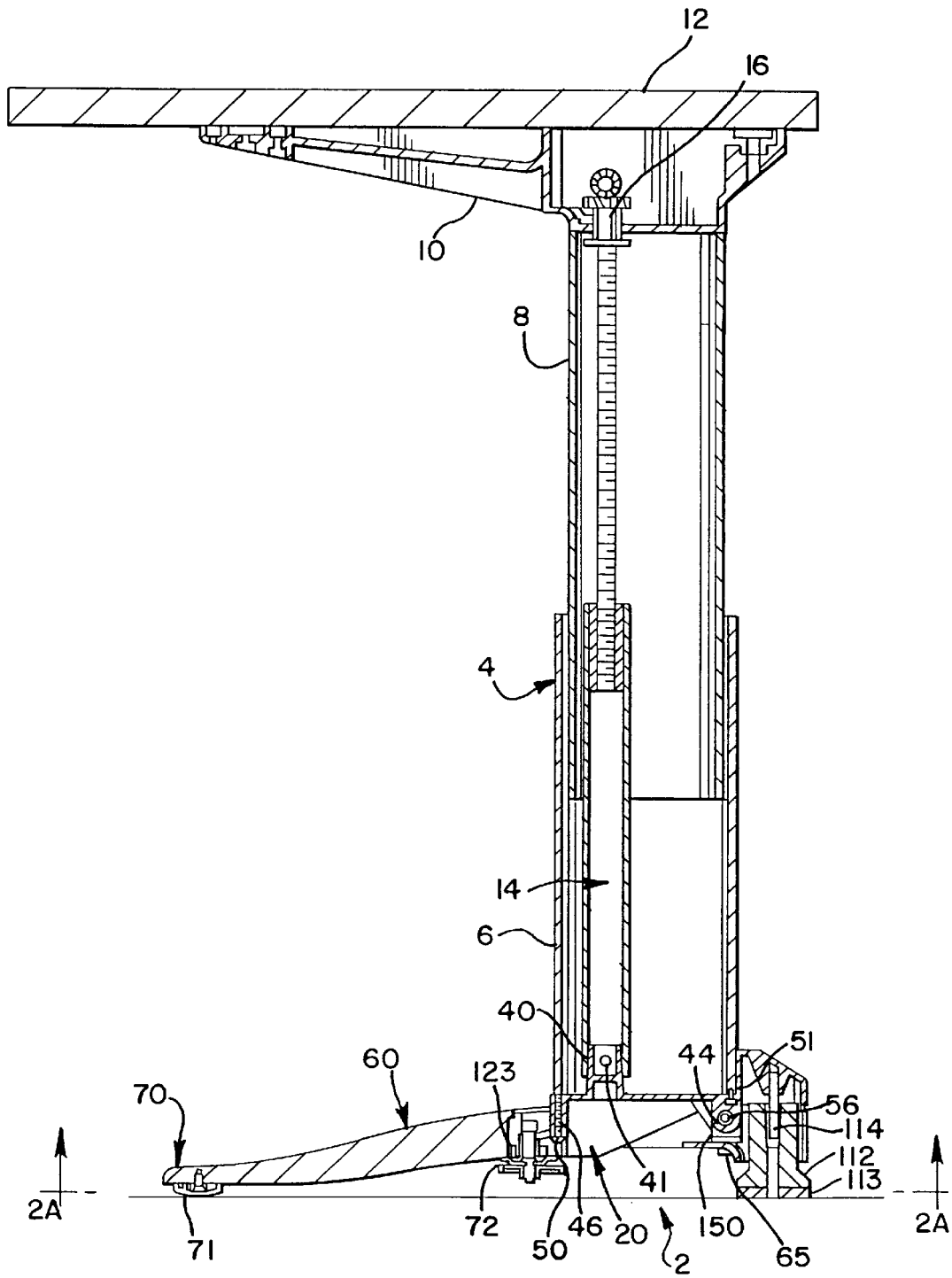
FIG. 2 is cross-sectional view of a desk and a leveling device taken along line 2—2 of FIG. 1.

Referring to the drawings, FIGS. 1–4 show a leveling device, including an ankle member 20 and a foot member 60. The leveling device 2 is mounted to a support leg 4. As shown in FIG. 2, the support leg 4 has a lower member 6 and an upper member 8 slidably received in the lower member 6. The upper member 8 is mounted to a bracket 10. The bracket 10 is attached to a work surface member 12. The lower member 6 is attached to the ankle member 20. As shown, the upper and lower members of the support leg 4 are preferably aluminum extrusions.

Figure 4:
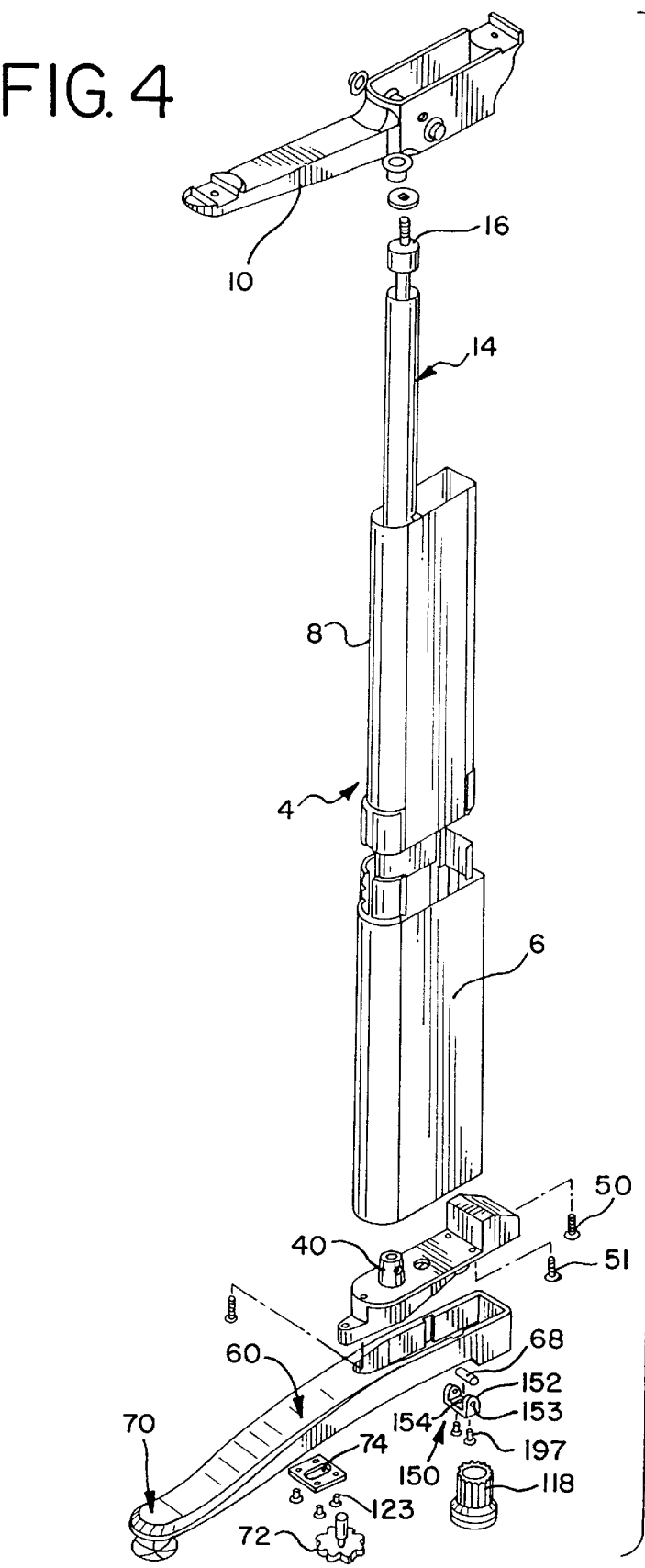
FIG. 4 is an exploded view of a support leg and the preferred embodiment of the leveling device.

In FIG. 1, the object being supported is depicted as a desk. This desk is described in the co-pending application Ser. No. 60/006,833, entitled Modular Desk and Desk System (Attorney Docket No. 3591-332), and filed Nov. 16, 1995, which is incorporated herein by reference. However, it should be understood that the leveling device can be used to support a variety of objects, including other office furniture items such as wall panels, cabinets and tables. In essence, the leveling device can be used to adjust the height and level of any object requiring such adjustment. Accordingly, the disclosure of the desk in the accompanying figures should be regarded as illustrative rather than limiting. The ankle member 20, shown in FIGS. 6–8, includes a top plate 26, a rear portion 80, a front portion 31, a rear support lug 36 and a pair of sidewalls 28 depending downwardly from the top plate 26. The top plate 26 is configured in substantially the same shape as the contour of the lower member 6 of the support leg 4, as shown in FIG. 4. The lower member 6 is disposed on the top plate 26 such that the edge of the top plate and the outer surface of the support leg are substantially flush. Preferably, the ankle member 20 is an aluminum casting.

Figure 6:
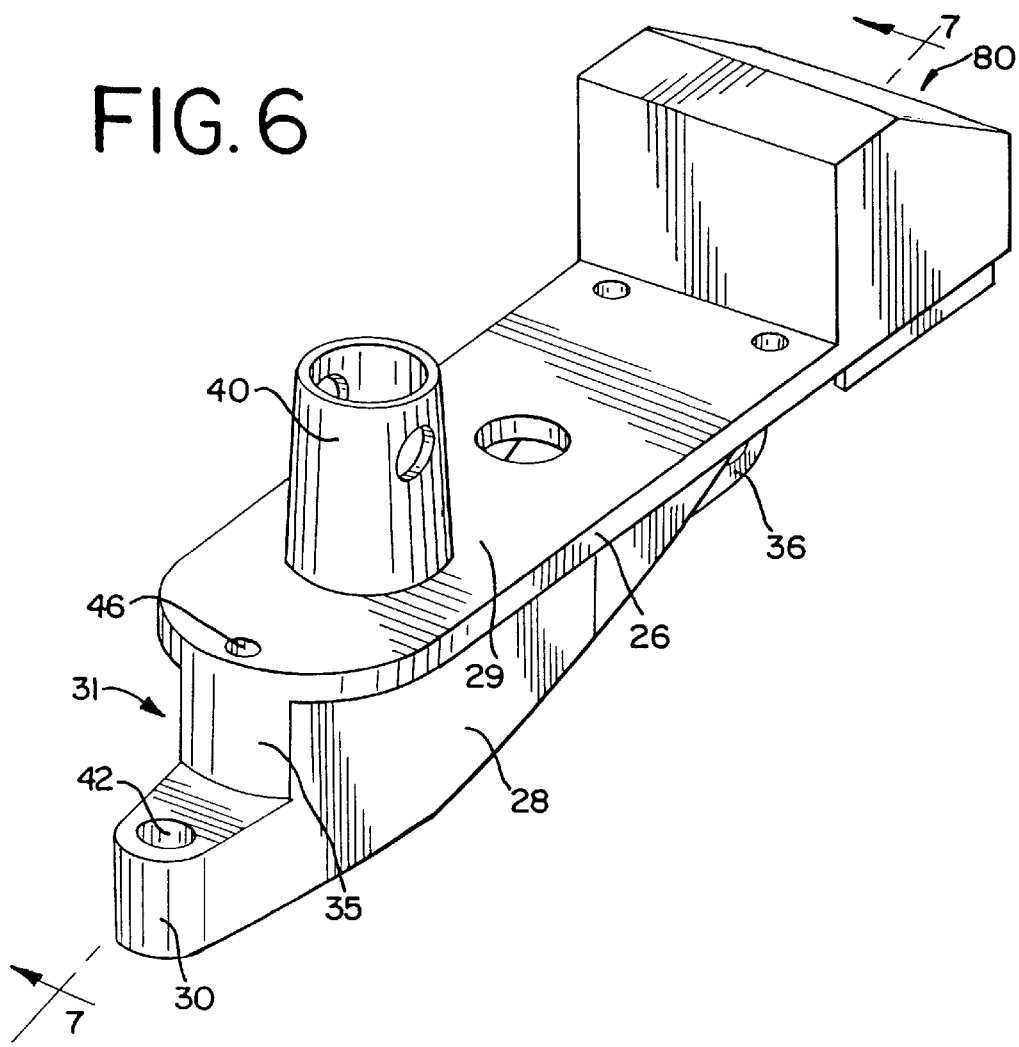
FIG. 6 is a perspective view of the ankle member.

In an exemplary embodiment, shown in FIGS. 2, 4 and 6, the ankle member 20 includes a frustoconically shaped housing 40, which extends upwardly from a top surface 29 of the top plate 26. Correspondingly, the support leg 4 includes a drive member 14 which is adapted to fit over the housing 40. The drive member 14 is disposed in the support leg 4 and is secured to the housing 40 with a pin 41. The drive member 14 is adapted to make the leg 4 height adjustable. An upper member 16 of the drive member is connected to the bracket 10.

The front portion 31 of the ankle member 20 includes a front support lug 30, which extends forwardly from a front section 35 of the ankle member 20, as shown in FIG. 6. The front support lug 30 has a first mounting hole 42 passing through it in a generally vertical direction.

The sidewalls 28 each have a front portion 32 and a rear portion 34. The front portions 32 of the sidewalls 28 are angled toward each other, such that the front portions 32 intersect each other and terminate at the front support lug 30 as shown in FIG. 8. The rear portions 34 of the sidewalls 28 lie generally parallel to each other and terminate at a landing 44. The landing 44 surrounds and underlies the rear support lug 36. The rear support lug 36 has a second mounting hole 38 passing through it in a generally horizontal direction. A pair of support webs 37 interconnect the rear support lug 36 and a bottom surface 27 of the top plate 26.

In an exemplary embodiment, the ankle member 20 is attached to the lower member 6 of the support leg 4 at three locations, as shown in FIGS. 2, 4, and 6. A first attachment hole 46 is positioned rearwardly of the first mounting hole 42 in the front section 35. The first attachment hole 46 passes through the front section 35, and lies substantially parallel to the first mounting hole 42. Second and third attachment holes 48 and 49 are positioned on either side of the rear support lug 36 as shown in FIG. 8, and pass through the landing 44. A plurality of fasteners 50 and 51 extend upwardly through the attachment holes 46, 48, and 49 and communicate with threaded holes located in the lower member 6 of the support leg 4.

In an alternative embodiment, the ankle member and the support leg can also be integrally formed. In such an embodiment, a bottom portion of the support leg includes a pair of spaced apart support lugs adapted to operably engage a foot member. Thus, the ankle member extends downwardly from the leg and comprises the bottom portion of the leg that includes the support lugs. Separation of the support leg and ankle member merely provides a user with access to the bottom portion of the support leg. Access can be important if the leg is height adjustable and has a height adjustment mechanism disposed within it, as shown in FIG. 2. As shown in FIGS. 2, 3 and 7, the rear portion 80 of the ankle member includes a housing 82 and a boss 52 extending downwardly from a top portion 84 of the housing 82. The boss 52 is disposed in a cavity 86 formed by the housing 82. A threaded stud 114 is fixedly secured to the boss 52 by press fitting it in an opening 53 positioned in the boss 50. Alternatively, the stud can threadably engage a threaded opening in the boss.

As illustrated in FIGS. 9–12, the foot member 60 includes a housing 62 and a support member 64 extending forwardly from the housing 62. The housing 62 includes a pair of side walls 66. The housing 62 has a generally open top portion 63 and a generally open bottom portion 65. The generally open bottom portion 65 includes a first opening 67 and a second opening 69. The housing 62 also includes a base plate 61 interconnecting bottom portions of the housing sidewalls 66. The base plate 61 separates and defines the first opening 67 and the second opening 69. The support member 64 includes a top portion 47 and a plurality of spaced apart, vertical ribs 45 extending downwardly from the top portion 47. Four, spaced-apart attachment bosses 43 depend downwardly from the top portion 47 in the spaces provided between the ribs 45 as shown in FIGS. 10 and 12.

The forwardly extending support member 64 terminates in a toe section 70. The toe section 70 preferably includes a glide pad 71 that remains flat on the support surface 90 as shown in FIG. 2, and is not adjustable. Preferably the glide pad 71 is plastic. Because the toe section 70 is not required for leveling adjustments, and remains flat on the support surface 90, it poses less of a tripping hazard, and interferes less with the user's feet. Accordingly, as shown in FIGS. 2 and 2A, the support member 64 and toe section 70 have a low profile or thin cross-section. As shown in FIG. 10, the ribs of the forwardly extending support member 64 taper out and terminate at the thin, flat toe section 70. The thickness of the toe section is preferably about 0.50 inches. In addition, the foot member 60 is preferably an aluminum casting.

The foot member 60 also includes a U-shaped support bracket 150, which has two support legs 152 and a base section 154, as shown in FIG. 4. Each support leg 152 has a hole 153 positioned in it such that the holes 153 are generally aligned about a horizontal axis.

To install the ankle member, the support bracket 150 is pivotally attached to the rear support lug 36 of ankle member 20 about a horizontal axis of rotation by disposing a support shaft 68 in holes 153 and 38. The support shaft 68 defines the horizontal axis of rotation 56.

The ankle member 20 and support bracket 150 are then inserted through the generally open top portion 63 of the housing 62 and are disposed in the housing 62. The base section 154 of the U-shaped bracket 150 is bolted to the base plate 63 with a plurality of bolts 197.

Figure 5:
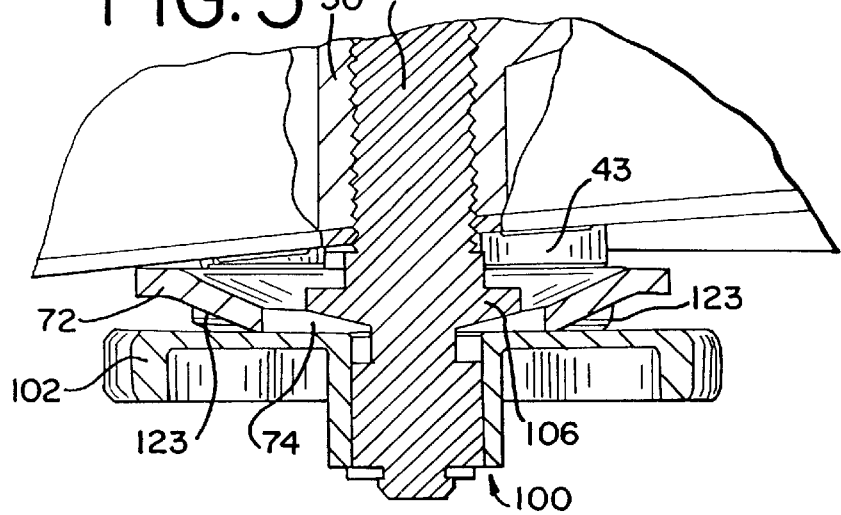
FIG. 5 is an enlarged view of the adjustment knob and its attachment to the foot member.

As illustrated in FIGS. 2, 4 and 5, the foot member 60 also includes a plate member 72 secured to attachment bosses 43 with a plurality of fasteners 123. The plate member 72 has a slot 74 positioned in it such that the slot 74 is generally aligned with the first mounting hole 42 when the ankle member 20 is pivotally attached to the foot member 60 at the horizontal axis of rotation 56.

As illustrated in FIGS. 2 and 5, an adjustment device 100 is provided to adjustably mount the forward support lug 30 to the housing 62. The adjustment device 100 includes a knob 102 and an adjustment shaft 104 extending upwardly from the knob 102. A shoulder 106 is formed on the adjustment shaft 104 above the knob 102. The adjustment shaft 104 is disposed in the slot 74 in the plate member 72 such that the shoulder 106 engages the plate member 72. The knob 102 is then secured to the end of the adjustment shaft 104 so that the plate member 72 is positioned between the knob 102 and the shoulder 106 as shown in FIG. 5. The shoulder 106 has a greater diameter than the width of the slot 74 as shown in FIGS. 4 and 5. Accordingly, the shoulder 106 bears up against the plate member 72, thereby transferring any load from the ankle member 20 to the plate member 72. The upper portion of the adjustment shaft 104, which is preferably threaded, operably engages the first mounting hole 42 positioned in the front section 35, which is also preferably threaded. As shown in the FIG. 2, the adjustment shaft 104 provides the front portion 31 of the ankle member 20 with about one inch of vertical adjustment.

In operation, a user rotates the adjustment knob 102, thereby causing the adjustment shaft 104 to operably engage the front section of the 35 ankle member at the first mounting hole 42. As the adjustment shaft 104 rotates, the forward support lug 30 is caused to move in a vertical direction. Vertical movement of the support lug 30, in turn, causes the ankle member 20 to rotate about the horizontal axis of rotation 56. Rotation of the ankle member 20 causes the support leg 4, and attached work surface member 12, to rotate about the horizontal axis of rotation 56, thereby allowing the support leg 4 and work surface member 12 to be adjustably leveled.

Rotation of the knob 102 can be incremental, thereby producing an incremental angular change in the location of the object being supported. Thus, the adjustment device 100 can be used to rotate the ankle member 20 and support leg 4 through a limitless number of angular positions relative to the foot member 60, and the ankle member 20 can be fixed at any such position simply by stopping the rotation. Therefore, if the leveling device 2 is positioned on an uneven support surface 90, the adjustment device 100 can be used to rotate and adjust the work surface 12 until it is level. This operation can be performed even when the work surface is loaded. Moreover, because each support leg 4 contains this unique adjustment feature, the work surface 12 can be adjusted to remain level even if the floor 90 tilts in opposite directions under opposite support members.

It should be understood that it is the distance between the forward support lug 30 and the rear support lug 36, and the length of the adjustment shaft 104, which define the amount of leveling capability. For example, if the distance between the rear support lug 36 and forward support lug 30 is increased, the vertical adjustment capability of the forward support lug 30 must be increased in order to obtain the same amount of rotation of the ankle member 20 relative to the foot member 60. Conversely, when the distance between the two lugs 30 and 36 is shortened, less vertical height adjustment of the forward support lug 30 is required to produce the same angular adjustment.

It should also be understood that the two support lugs 30 and 36 carry the moment or bending load imposed by any off-center load, such as the cantilevered desk or table shown in FIG. 1. Thus, when the two support lugs 30 and 36 are positioned close together, the corresponding tension and compression loads, which react to the bending load imposed by the support leg 4, are greatly increased. Conversely, the greater the distance between the support lugs, the less bending reaction force is produced. The support lugs must also carry the vertical load corresponding to the weight of the object being supported.

In essence, the distance (L) between the two lugs 30 and 36 is both a function of desired rotation and load carrying capability. As shown in FIG. 7, the distance (L) between the lugs is about 7 inches. This distance, in conjunction with about a one inch threaded adjustment shaft 104, provides about a two inch leveling capability when used with an adjustable heel member.

The leveling device, as shown in FIG. 2, is ideally suited to provide leveling adjustment for cantilevered desks, or other objects having a center of gravity spaced apart from the support leg 4. The elongated shape of the foot member 60 permits the moment produced by the weight of the object being supported to be carried over a greater distance, thereby reducing the loads transferred between the foot member 60 and the support surface 90. Moreover, the two point attachment of the ankle member 20 and foot member 60 permits the moment to be efficiently transferred from the support leg 4 to the foot member 60 through a coupled tension and compression load, rather than through bending.

It should be understood that the rear support lug and the forward support lug could be reversed, i.e., the point of pivotal attachment could lie forward of the point of adjustable vertical mounting, without changing the leveling capability of the device.

Another aspect of this invention is the heel member 110, shown in FIG. 3. Preferably, the heel member 110 is rotatably attached to and extends downwardly from the rear portion 80 of the ankle member 20. The bottom 112 of the heel is adapted to engage the support surface 90. Preferably a plastic glide member 113 is disposed on the bottom 112. In a preferred embodiment, the heel member 110 is adjustably mounted to the rear portion 80 of the ankle member 20 so as to allow for vertical adjustment of the rear portion 80 relative to the support surface 90. In this embodiment, the heel member 110 includes a glide housing 116.

The glide housing 116 includes an outer shell 118 and an inner sleeve member 120. The inner sleeve member 120 is press fitted into the outer shell 118. The inner sleeve member 120 is preferably metal and includes a threaded opening 54 adapted to threadably engage the stud 114 secured in the boss 52. Alternatively, the stud can be fixedly mounted to the glide housing and adapted to threadably engage a threaded opening in the boss 52. The outside surface of the outer shell 118 includes a plurality of ribs 124, which allow the user to grip and rotate the housing 116.

In operation, the stud 114 engages the threaded opening 54 located in the inner sleeve member 120. As the stud 114 operably engages the threaded opening 54, the glide housing 116 passes through the second opening 69 in the housing and is received in the cavity 86 formed in the housing 82 of the ankle member. As the glide housing 116 is rotated, the rear portion 80 of the ankle member 20 is caused to move upwardly or downwardly in a vertical direction. Thus, the entire leveling device 2 is made height adjustable. Rotation of the glide housing 116 can be incremental, thereby producing an incremental vertical adjustment of the ankle member 20 relative to the floor.

Moreover, because each leveling device 2 can include the heel member 110, a two-legged object is provided with side-to-side leveling capability. When used in combination, the heel member 110 and adjustment device 100 can be used to adjust both the level and height of the work surface member.

Figure 13:
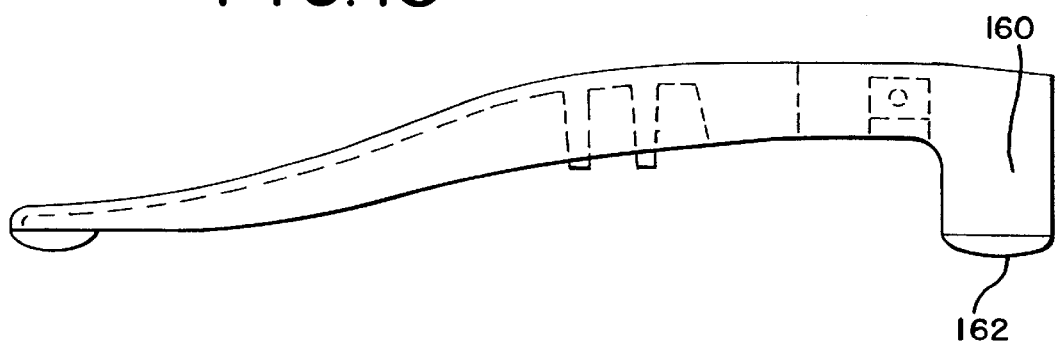
FIG. 13 is a side view of an alternative embodiment of the foot member having an integrally formed heel member.

In the alternative embodiment shown in FIG. 13, the heel member 160 extends downwardly from the rear portion of the foot member, as shown in FIG. 13. In such an embodiment, the heel member is integrally formed with the rear portion. The heel member 160 includes a glide pad 162.

Figure 14:
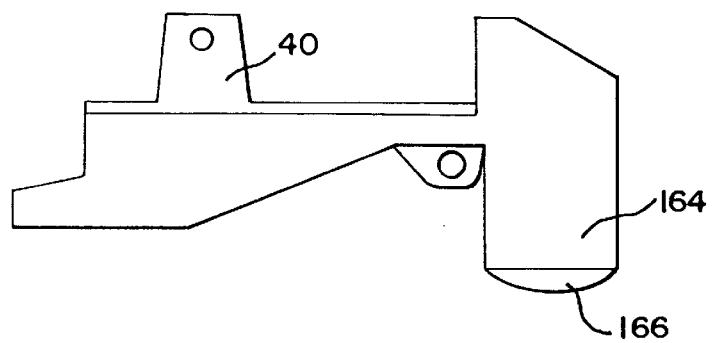
FIG. 14 is a side view of an alternative embodiment of the ankle member having an integrally formed heel member.

In yet another embodiment shown in FIG. 14, the heel member 164 is integrally formed with the rear portion of the ankle member. In such an embodiment, the heel member extends below the foot member and engages the floor, but is not height adjustable. As before, the heel member 164 includes a glide pad 166.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. An apparatus for leveling a support leg on a floor, said apparatus comprising:

an ankle member adapted to extend from a bottom of said support leg, said ankle member having a rear portion;

a foot member including a front portion and a rear portion, wherein said ankle member is disposed in said rear portion and said rear portion is pivotally attached to said ankle member about a horizontal axis of rotation, and said front portion adapted to engage the floor;

a heel member extending downwardly from said rear portion of said ankle member, which heel member can be fixedly extended and retracted within said ankle member to adjust the height of the ankle member and thereby adjust the height of the support leg, said heel member adapted to engage the floor; and an adjustment device operable for adjusting the pivotal relationship between the ankle member and the foot member, said adjustment device interconnecting said ankle member and said foot member at a location spaced apart from said horizontal axis of rotation.

2. The apparatus of claim 1 further comprising a threaded stud interconnecting said rear portion of said ankle member and said heel member, whereby a rotation of the heel member causes the ankle member to move in a vertical direction relative to the floor.

3. The apparatus of claim 2 in said heel member further comprises a glide housing having an opening adapted to threadably engage said stud.

4. The apparatus of claim 1 wherein said rear portion of said foot member comprises a housing and a support bracket disposed in said housing, and said ankle member comprises a rear support lug, wherein said ankle member is disposed in said housing and a support shaft pivotally attaches said support lug to said support bracket about said horizontal axis of rotation.

5. The apparatus of claim 1 wherein said adjustment device comprises a knob and a shaft extending from said knob, said shaft rotatably secured to said foot member and which operably engages a front portion of said ankle member, whereby rotation of said shaft causes the front portion of said ankle member to move in a vertical direction relative to said floor and causes said ankle member to pivot relative to said foot member about a horizontal axis of rotation.

6. The apparatus of claim 5 wherein said foot member further comprises a plate member disposed on a bottom of said front portion of said foot member, said plate member having an opening, wherein said adjustment shaft is rotatably secured to said plate member within said opening.

7. The apparatus of claim 6 wherein said front portion of said ankle member has a vertically oriented threaded opening, wherein said adjustment shaft threadably engages said threaded opening.

8. The apparatus of claim 1 wherein said front portion of said foot member comprises a top portion and a plurality of ribs extending downwardly from said top portion.

9. The apparatus of claim 8 wherein said top portion and said ribs taper out to form a toe section.

10. The apparatus of claim 9 wherein said toe section includes a glide pad having a surface adapted to engage said floor.

11. The apparatus of claim 1 further comprising a support leg extending upwardly from said ankle.

12. The apparatus of claim 11 further comprising a work surface member attached to a top portion of said support leg.

13. An apparatus for leveling a support leg on a floor, said apparatus comprising:
   an ankle member having a rear portion and a front portion;
   a foot member comprising a housing and a support member extending forwardly from said housing; and
   a heel member extending downwardly from said rear portion of said ankle, wherein said heel member is adapted to engage said floor;
   wherein said ankle member is disposed in said housing and is pivotally attached to said foot member about a horizontal axis of rotation, and wherein said front portion of said ankle member is adjustably mounted to said foot member forward of said axis of rotation so as to allow the ankle member to be pivoted through and fixed at various angles relative to the foot member.

14. The support device of claim 13 further comprising an adjustment device, said adjustment device comprising a knob and a shaft extending from said knob, wherein said shaft is rotatably secured to said support member, and wherein said adjustment shaft operably engages said front portion of said ankle member, whereby rotation of said shaft causes the front portion of said ankle member to move in a vertical direction relative to said support surface and causes said ankle member to rotate relative to said foot member about said horizontal axis of rotation.

15. An apparatus for leveling a support leg on a floor, said apparatus comprising:
   an ankle member having a forward support lug and a rear support lug spaced apart from said forward support lug, said forward support lug having a vertically oriented threaded opening, and said rear support lug having a horizontally oriented opening;
   a foot member comprising a housing, a support member extending forwardly from said housing, a support bracket mounted to said housing, wherein said support bracket has an opening defining a horizontal axis of rotation, and a bottom plate member mounted to said support member, said plate member having an opening; and
   an adjustment device comprising a knob and a threaded shaft extending upwardly from said knob;
   wherein said ankle member is disposed in said housing and a support shaft pivotally attaches said rear support lug to said support bracket about said horizontal axis of rotation; and
   wherein said threaded shaft is rotatable secured to said plate member within said opening of said plate member, and wherein said shaft operably engages said threaded opening in said forward support lug;
   whereby a rotation of said knob and said threaded shaft causes said forward support lug to move in a vertical direction relative to said support surface and causes said ankle member to pivot relative to said foot member about said axis of rotation.

16. The apparatus of claim 15 further comprising a heel member extending downwardly from a rear portion of said ankle member, which heel member can be fixedly extended and retracted within the ankle member to adjust the height of the ankle member and thereby adjust the height of the support leg.

17. The apparatus of claim 16 further comprising a threaded stud, and wherein said rear portion of said ankle member comprises a housing having a cavity, and a boss extending downwardly from a top portion of said housing into said cavity, wherein said threaded stud is disposed in said boss and said heel member has a threaded opening adapted to receive said stud, wherein said heel member threadably engages said stud at said threaded opening of said heel member.

18. The apparatus of claim 15 wherein said support member of said foot member comprises a top portion and a plurality ribs extending downwardly from said top portion.

19. The apparatus of claim 18 wherein said top portion and said ribs taper out to form a toe section, said toe section including a glide pad for engaging the floor.

20. A method for leveling an object on a floor comprising:
   providing a foot member adapted to engage said floor;
   providing an ankle portion disposed in and pivotally attached to said foot member about a horizontal axis of rotation;
   providing an adjustment device moveably connecting said foot member and said ankle member at a location spaced apart from said horizontal axis of rotation; and
   pivoting said foot member relative to said ankle portion about said horizontal axis to a desired pivotal location;
   fixing the location of said foot member relative to said ankle portion;
   providing a heel member threadably coupled with said ankle member;
   rotating said heel member wherein said heel member is moved between a retracted position and an extended position relative to said ankle member.

21. The method of claim 20 wherein said step of pivoting comprises manipulating said adjustment device such that said foot member is moved relative to said ankle member at said spaced apart location and such that said foot member is pivoted relative to said ankle member about said horizontal axis.

22. The method of claim 20, wherein said adjustment device comprises a threaded shaft rotatably connected to one of said foot member and said ankle member and threadably engaging the other of said foot member and said ankle member.

23. The method of claim 22 wherein said threaded shaft is rotatably connected to said foot member and threadably engages said ankle member.

24. An office furniture component comprising:
   a pair of support legs, each of said support legs comprising an ankle portion;
   a foot member pivotally attached to each of said ankle portions about a horizontal axis of rotation;
   a heel member moveably connected to one of said ankle portion and said foot member on each of said support legs, wherein each of said heel members is moveable between a retracted position and an extended position; and an adjustment device disposed between said ankle member and said foot member at a location spaced from said horizontal axis of rotation on each of said support legs, said adjustment device operable to move said foot member relative to said ankle member at said spaced apart location wherein said foot member is pivoted relative to said ankle member about said horizontal axis of rotation.

25. The office furniture component of claim 24 wherein each of said heel members is moveably mounted to said ankle member on each of said support legs respectively.

26. The office furniture component of claim 25 wherein said heel member is threadably coupled with said ankle member.

27. An apparatus for leveling a support leg on a floor, said apparatus comprising:

an ankle member adapted to extend from a bottom of said support leg;

a foot member including a front portion and a rear portion, said rear portion pivotally attached to said ankle member about a horizontal axis of rotation, and said front portion adapted to engage the floor;

a heel member extending downwardly from a rear portion of said ankle member, said heel member adapted to engage the floor, wherein a threaded stud interconnects said rear portion of said ankle member and said heel member, said heel member comprising a glide housing having an opening threadably engaging said stud, said glide housing comprising a plurality of vertical ribs which permit a user to grip and rotate the glide housing; and an adjustment device for adjusting the pivotal relationship between the ankle member and the foot member, said adjustment device interconnecting said ankle member and said foot member at a location spaced apart from said horizontal axis of rotation.

28. An apparatus for leveling a support leg on a floor, said apparatus comprising:

an ankle member adapted to extend from a bottom of said support leg, said ankle member comprising a support lug;

a foot member including a front portion and a rear portion, wherein said rear portion comprises a housing and a support bracket disposed in said housing, wherein said ankle member is disposed in said housing, and wherein said front portion is adapted to engage the floor;

a support shaft pivotally attaching said support lug to said support bracket about a horizontal axis of rotation;

a heel member extending downwardly from one of said rear portion of said foot member and said ankle member, said heel member adapted to engage the floor; and an adjustment device operable for adjusting the pivotal relationship between the ankle member and the foot member, said adjustment device interconnecting said ankle member and said foot member at a location spaced apart from said horizontal axis of rotation.

29. An apparatus for leveling a support leg on a floor, said apparatus comprising:

an ankle member adapted to extend from a bottom of said support leg;

a foot member including a front portion and a rear portion, wherein said ankle member is disposed in said rear portion and said rear portion is pivotally attached to said ankle member about a horizontal axis of rotation, and said front portion adapted to engage the floor, said foot member further comprising a plate member disposed on a bottom of said front portion of said foot member, said plate member having an opening;

a heel member extending downwardly from one of said rear portion of said foot member and said ankle member, said heel member adapted to engage the floor; and an adjustment device operable for adjusting the pivotal relationship between the ankle member and the foot member, said adjustment device interconnecting said ankle member and said foot member at a location spaced apart from said horizontal axis of rotation, said adjustment device comprising a knob and a shaft extending upwardly from said knob, said shaft rotatably secured to said plate member within said opening and which operably engages a front portion of said ankle member, whereby rotation of said shaft causes said ankle member to pivot relative to said foot member about said horizontal axis of rotation.

* * * * *

UNITED STATES PATENT AND TRADEMARK OFFICE
CERTIFICATE OF CORRECTION

PATENT NO. : 6,070,840
DATED : June 6, 2000
INVENTOR(S) : James O.Kelly et al.

It is certified that error appears in the above-identified patent and that said Letters Patent is hereby corrected as shown below:

Claims
Line 1, delete "in" and substitute -- wherein --.
Line 3, delete "plurality ribs" and substitute -- plurality of ribs --
Line 22, line 1, delete "claim 20, whrein" and substitute -- claim 20 wherein --.

Signed and Sealed this

Fourteenth Day of August, 2001

*Attest:*

NICHOLAS P. GODICI
*Attesting Officer*    *Acting Director of the United States Patent and Trademark Office*